(12) United States Patent
Guzman et al.

(10) Patent No.: US 11,920,277 B2
(45) Date of Patent: Mar. 5, 2024

(54) PUMP MOUNT SYSTEM FOR A LAUNDRY TREATING APPLIANCE

(71) Applicant: WHIRLPOOL CORPORATION, Benton Harbor, MI (US)

(72) Inventors: Alejandro Guzman, Monterrey (MX); Dennis Kehl, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 83 days.

(21) Appl. No.: 17/334,875

(22) Filed: May 31, 2021

(65) Prior Publication Data
US 2021/0285142 A1 Sep. 16, 2021

Related U.S. Application Data

(63) Continuation of application No. 16/040,711, filed on Jul. 20, 2018, now Pat. No. 11,053,626.

(51) Int. Cl.
*D06F 37/24* (2006.01)
*D06F 37/20* (2006.01)
*D06F 39/08* (2006.01)
*F16F 3/087* (2006.01)
*D06F 23/04* (2006.01)
*D06F 39/12* (2006.01)

(52) U.S. Cl.
CPC .............. *D06F 37/24* (2013.01); *D06F 37/20* (2013.01); *D06F 39/085* (2013.01); *D06F 23/04* (2013.01); *D06F 39/12* (2013.01); *F16F 3/0876* (2013.01)

(58) Field of Classification Search
CPC ........ D06F 23/04; D06F 39/085; D06F 39/12; D06F 39/088; D06F 37/20; D06F 37/24; F16F 3/0876
See application file for complete search history.

(56) References Cited

U.S. PATENT DOCUMENTS 2,658,710 A 11/1953 Titus
4,858,880 A 8/1989 Durand
(Continued)

FOREIGN PATENT DOCUMENTS

CN 104047150 A 9/2014
DE 102014106604 A1 11/2015
(Continued)

OTHER PUBLICATIONS

European Patent Office, European Search Report Re Application No. 19179832.1-1018, dated Sep. 24, 2019, 7 Pages, Munich, Germany.

*Primary Examiner* — Joseph L. Perrin
(74) *Attorney, Agent, or Firm* — McGarry Bair PC

(57) ABSTRACT

A pump mount system for a laundry treating appliance having a cabinet and a pump located within the cabinet, a pump mount secured to the pump; a base mount spaced from the pump mount; at least one vibration isolator comprising a singular body having a first portion passing through a first opening on the pump mount, a second portion extending between the pump mount and the base mount, and a pin aperture passing through the vibration isolator; a pin removably received within the pin aperture; and at least one protrusion extending from at least one of the vibration isolator or the pin; wherein the at least one protrusion is engaged with at least one of the pin, the vibration isolator, or the base mount.

20 Claims, 14 Drawing Sheets

(56) References Cited

U.S. PATENT DOCUMENTS

| | | | |
|---|---|---|---|
| 5,445,503 A * | 8/1995 | Kmiec | F04D 29/606 |
| | | | 417/363 |
| 5,913,892 A | 6/1999 | Kwon | |
| 6,141,995 A | 11/2000 | Johnson | |
| 6,478,555 B1 | 11/2002 | Kim et al. | |
| 8,176,756 B2 | 5/2012 | Yim et al. | |
| 2004/0173426 A1 | 9/2004 | Athanasiou | |
| 2005/0196294 A1 | 9/2005 | Clark et al. | |
| 2006/0000240 A1 | 1/2006 | Song | |
| 2009/0301142 A1 | 12/2009 | Marioni | |
| 2010/0095713 A1 | 4/2010 | Yim et al. | |
| 2011/0154676 A1 | 6/2011 | Castiglione et al. | |
| 2012/0167931 A1 | 7/2012 | Park et al. | |
| 2013/0074554 A1 | 3/2013 | Chun et al. | |
| 2017/0096767 A1 | 4/2017 | Kim et al. | |
| 2017/0101733 A1 | 4/2017 | Jung et al. | |
| 2017/0101734 A1 | 4/2017 | Jung et al. | |
| 2018/0023240 A1 | 1/2018 | Xu et al. | |

FOREIGN PATENT DOCUMENTS

| | | |
|---|---|---|
| EP | 3153707 A1 | 4/2007 |
| EP | 2341179 A1 | 7/2011 |
| EP | 3126564 A1 | 2/2017 |
| JP | 2009219598 A | 10/2009 |
| KR | 100715044 B1 | 5/2007 |
| WO | 2015150208 A1 | 10/2015 |

* cited by examiner

PUMP MOUNT SYSTEM FOR A LAUNDRY TREATING APPLIANCE

CROSS REFERENCE TO RELATED APPLICATION

This application is a continuation of U.S. patent application Ser. No. 16/040,711 filed Jul. 20, 2018, now U.S. Pat. No. 11,053,626, issued Jul. 6, 2021, which is incorporated herein in its entirety.

BACKGROUND

Laundry treating appliances, such as clothes washers, clothes dryers, refreshers, and non-aqueous systems, can have a configuration in which a laundry treating chamber is located within a cabinet. In certain applications pumping of fluids is required to drain or fill the laundry treating chamber. During operation both the laundry treating appliance and the pump can cause vibration and unwanted transfer of motion within the cabinet. The pumps are therefore mounted to the cabinet to dampen these vibration transfers.

Typical mounts for pumps utilize screws and or clips to secure the pump in place. In a laundry treating appliance these added parts result in a more complex assembly process, leading to higher assembly costs and provide more support than is actually necessary for this application in a laundry treating appliance.

SUMMARY

In one aspect, the present disclosure relates to a pump mount system having a pump, the pump mount system comprising: a pump mount secured to the pump; a base mount spaced from the pump mount; at least one vibration isolator comprising a singular body having a first portion passing through a first opening on the pump mount, a second portion extending between the pump mount and the base mount, and a pin aperture passing through the vibration isolator; a pin removably received within the pin aperture; and at least one protrusion extending from at least one of the vibration isolator or the pin; wherein the at least one protrusion is engaged with at least one of the pin, the vibration isolator, or the base mount.

In another aspect the present disclosure relates to a pump mount system for a laundry treating appliance having a cabinet and a pump located within the cabinet, the pump mount system comprising: a cabinet mount secured to the cabinet; a pump mount secured to the pump; at least one vibration isolator having a first portion passing through a first opening on the pump mount, a second portion extending between the pump mount and the cabinet mount, and a pin aperture passing through the vibration isolator; a pin comprising a body removably received within the pin aperture, the body terminating in a pin head with a width larger than the body; and at least one of the first portion and second portion deformable when the pin is received within the pin aperture.

In yet another aspect the disclosure relates to a method of mounting a pump system for a laundry treating appliance having a pump mount to a cabinet mount the method comprising: receiving a first portion of a vibration isolator through a first opening in the pump mount; receiving a pin through a pin aperture in the vibration isolator; deforming a portion of the vibration isolator to prevent withdrawal of the vibration isolator through the first opening; and engaging a portion of the vibration isolator with one of the pin or pump mount.

DESCRIPTION

Aspects of the disclosure relate to a pump mount system including a pump mount or pump sub-plate and a cabinet mount or base mount suitable for use in a laundry treating appliance. The pump sub-plate and the base mount can be any suitable piece of sheet metal or the like utilized in mounting a pump to a cabinet of a laundry treating appliance. While explained in the context of a laundry treating appliance, it should be understood that the pump mount system as described herein can be incorporated in any suitable appliance where a pump or vibration producing device mount system is utilized.

The pump mount system as described herein includes several variations of a pin and vibration isolator. In one variation, the pin and cabinet mount are of the same material and integral with each other such that the pin is bent out and away from the cabinet mount forming a substantially 90 degree angle between the pin and cabinet mount. The vibration isolator is connected to the pump sub-plate and received over the pin. The pin, in more than one variation, includes a head having a varying shape that enables locking with the vibration isolator. The vibration isolator maintains a space between the cabinet mount and the pump sub-plate. The pin as will be described herein can have varying shapes and extend away from the cabinet mount varying lengths.

In another variation, the vibration isolator extends between the pump sub-plate and the cabinet mount and is received through an aperture in the cabinet mount. A pin is pushed through a pin aperture from a top of the vibration isolator such that when the pin extends all the way through the pin aperture and below the cabinet mount it causes a slip fit base of the vibration isolator to splay open and lock the vibration isolator in place. The pin for the slip fit variation can include a head that causes the pin to stop movement at the appropriate distance, or no head such that when the pin is in place, the entirety of the pin is within the pin aperture of the vibration isolator.

Figure 1:
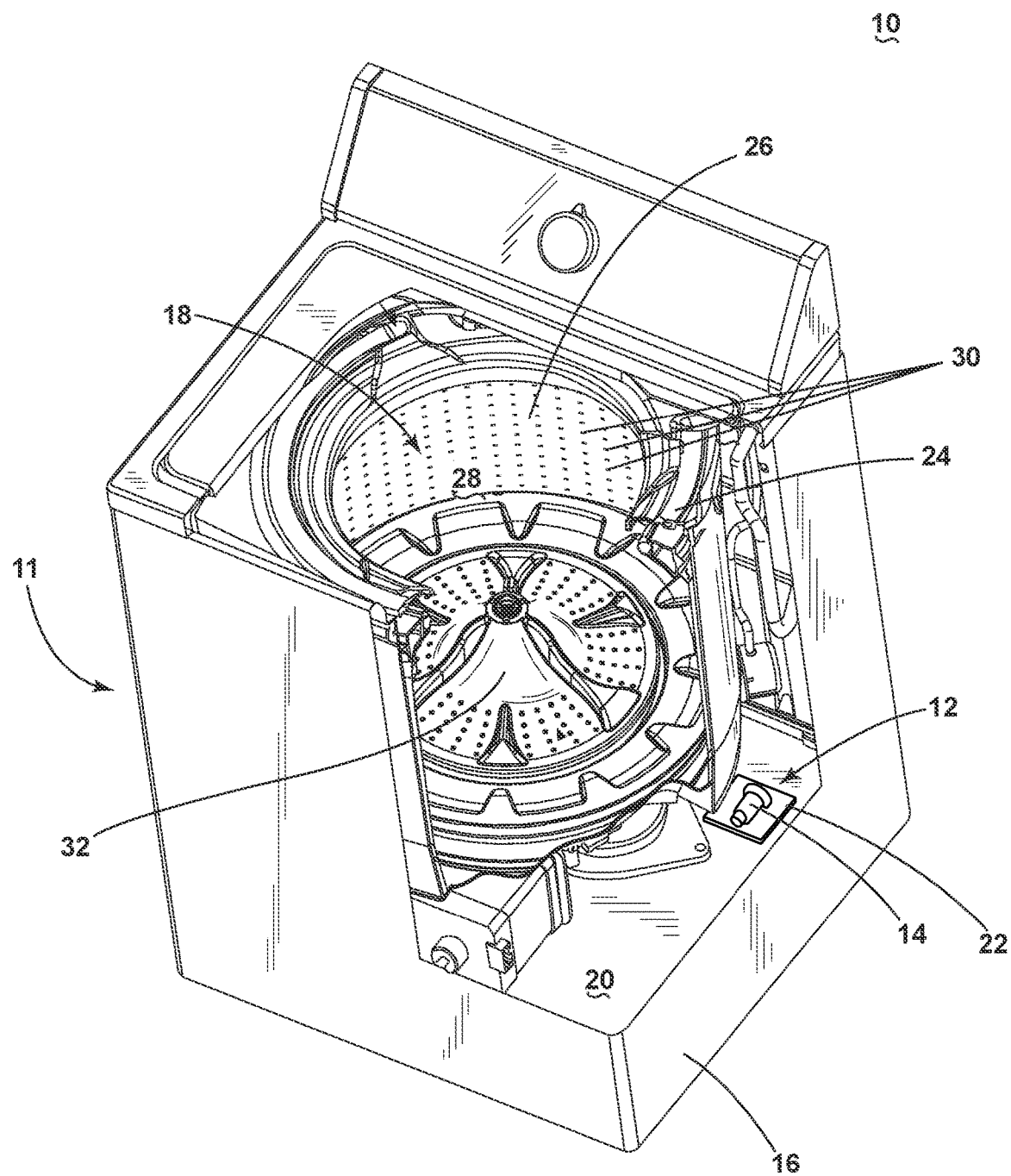
FIG. 1 is a perspective view of a laundry treating appliance in the form of a washing machine with a pump mount system.

FIG. 1 is a perspective view of a laundry treating appliance 10 with a pump mount system 12 where a pump 14 is mounted to a cabinet 16 of the laundry treating appliance 10. While the illustrated laundry treating appliance 10 is a vertical axis washing machine 11, the pump mount system as described herein is not limited to vertical axis washing machines. Depending on the implementation, a horizontal axis washing machine or a dryer, can provide a suitable environment for the described pump mount system 12. Similarly, the pump mount system 12 can be implemented in other laundry treating appliances such as: a combination washing machine and dryer; a tumbling or stationary refreshing/revitalizing machine; an extractor; a non-aqueous washing apparatus; and a revitalizing machine, depending on the need for a pump mount system in each of the applications.

The washing machine 11 includes a structural support system including the cabinet 16 which defines a housing within which a laundry holding system 18 resides. The cabinet 16 may be a housing having a chassis and/or a frame, defining an interior 20 in which the pump mount system 12 is located. A cabinet mount 22 can be a base mount secured to the cabinet 16 where the pump 14 is mounted. It is also contemplated that the base mount 22 is a portion of the cabinet 16 and integral with the cabinet 16. The interior 20 can enclose other components typically found in a conventional washing machine, such as motors, fluid lines, controls, sensors, transducers, and the like. These other components will not be described further herein except as necessary for a complete understanding of the disclosure set forth herein.

The laundry holding system 18 can include a tub 24 supported within the cabinet 16 by a suitable suspension system and a drum 26 provided within the tub 24, with the drum 26 defining at least a portion of a laundry treating chamber 28. The drum 26 may include a plurality of perforations 30 such that liquid may flow between the tub 24 and the drum 26 through the perforations. It is also within the scope of an aspect of the disclosure herein for the laundry holding system 18 to comprise only a tub with the tub defining the laundry treating chamber. A rotatable clothes mover 32 may be provided within the treating chamber 28 for imparting mechanical energy to the laundry items during a cycle of operation. The clothes mover 32 may be an agitator, impeller, nutator, or the like for imparting mechanical energy to the laundry items. Any further description of the washing machine 11 will only be described herein as necessary for a complete understanding of the disclosure set forth herein.

During operation, the washing machine 11 and the pump 14 can produce vibrations that can be translated to each other. As will be described herein, the pump mount system 12 includes at least one vibration isolator 40 (FIG. 2) provided between the cabinet 16 and the pump 14 to minimize the exchange of vibrations between the laundry holding system 18 and the pump 14 while also holding the pump 14 in place. The vibration isolator 40 as described herein can be designed to isolate the same or different frequencies of vibrations, as well as the same or different magnitudes of vibrations. In this way, they can be "tuned" to the expected vibrations with respect to the locations at which they are placed.

Figure 2:
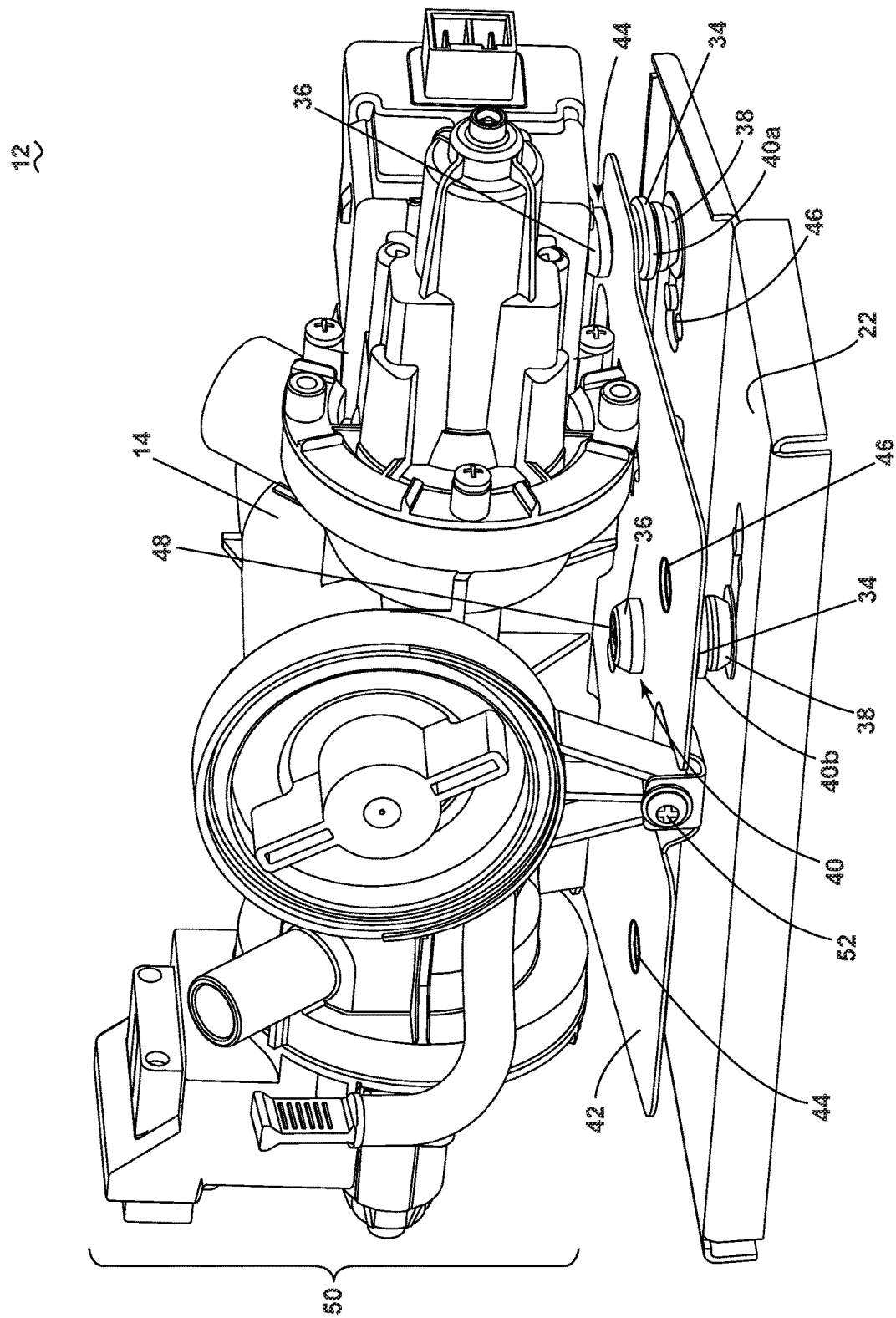
FIG. 2 is a perspective view of the pump mount system of FIG. 1 with at least one vibration isolator extending between a cabinet mount and a pump mount according to an aspect of the disclosure herein.

FIG. 2 is a perspective view of the pump mount system 12 according to an aspect of the disclosure herein. The at least one vibration isolator 40, illustrated as two vibration isolators 40a, 40b, extends between the cabinet mount 22 and a pump mount 42. The pump mount 42 can be a pump sub-plate and will be referred to herein as a pump sub-plate 42 so as not to be confused with the pump mount system 12 as a whole. While referenced as a pump sub-plate 42, the pump mount 42 can be any suitable pump mount for securing a pump including but not limited to pump mounting feet in that the pump mount is not necessarily a separate part with respect to the pump 14. It is contemplated that the cabinet mount 22, generally referred to from now on as a base mount 22 so as not to be confused with the cabinet 16, is affixed to the cabinet 16 (FIG. 1) at a location associated with the utilization of the pump 14. As previously mentioned herein, the base mount 22 and the pump sub-plate 42 can be made of sheet metal or any suitable material for mounting the pump 14 to the cabinet 16 (FIG. 1).

The at least one vibration isolator 40 can be made of any suitable material, by way of non-limiting example a rubber pliable material such as urethane or EPDM (ethylene propylene diene monomer) rubber. It is also contemplated that the at least one vibration isolator 40 is a singular piece. The at least one vibration isolator 40 can include ribs 34 for providing structural integrity. The at least one vibration isolator 40 can include a first portion 36 and a second portion 38. The first portion 36 extends above the pump sub-plate 42, while the second portion 38 extends between the pump sub-plate and the base mount 22. In one possible configuration, it is contemplated that both the first and second portions 36, 38 have a frustum-cone shape.

The pump sub-plate 42 can include at least one first opening 44. The at least one first opening 44 can be a plurality of openings 44 as illustrated. The first opening 44 can be in the form of a slot as can be seen with respect to vibration isolator 40a. With respect to a slot, the vibration isolator 40a can be coupled to the pump sub-plate 42 by being slid into place. The first opening 44 can also be in the form of through-holes as illustrated in the front of the pump sub-plate 42 without any vibration isolator received through them. With respect to the vibration isolator 40b, the first portion 36 of the vibration isolator 40b received through the first opening 44 in the form of a through-hole until the vibration isolator 40b snaps into place. The frustum-cone shape of the first portion 36 contributes to more easily receiving the first portion 36 through the at least one first opening 44. Depending on the load, a single front mount vibration isolator 40b is utilized for a lighter load, while vibration isolators could be received through the empty first opening 44 to support a heavier load. The base mount 22 can include stamped portions 46 corresponding to each of the utilized first opening 44. These stamped portions 46 can be formed by a punch press or the like to enable the bending out of a pin 48 from the base mount 22. The pin 48 extends through each of the vibration isolators 40a, 40b.

A pump system 50 including the pump 14 is coupled to the pump sub-plate 42 by conventional fasteners 52, by way of non-limiting example a bolt or a screw as illustrated. Any further description of the pump system 50 will only be described herein as necessary for a complete understanding of the disclosure set forth herein.

Figure 3:
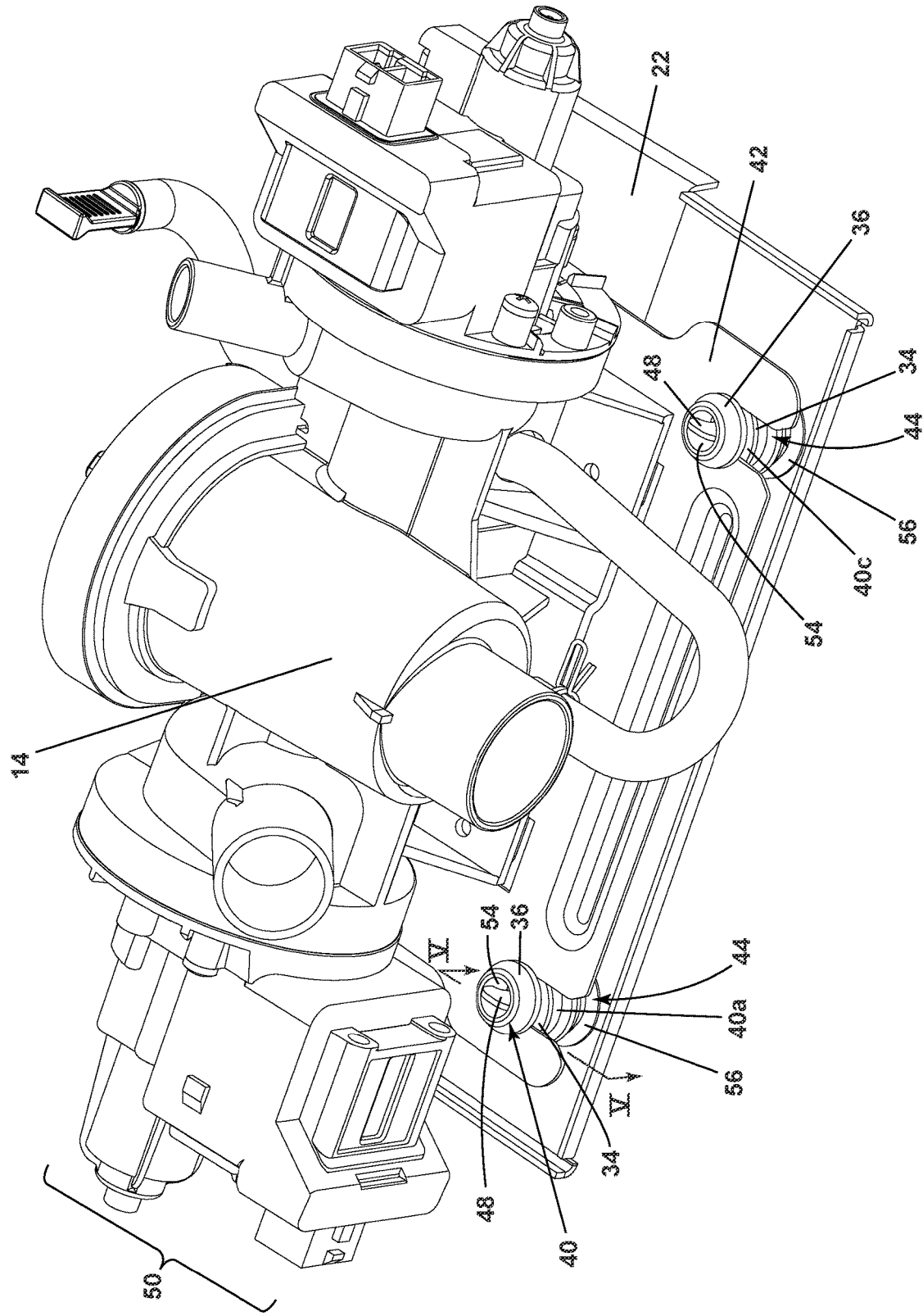
FIG. 3 is a perspective top down view of the pump mount system of FIG. 1 with at least one vibration isolator received over a pin according to another aspect of the disclosure herein.

Turning to FIG. 3, a top down perspective view of the back of the pump mount system 12 illustrates an additional vibration isolator 40c. The pin 48, can more clearly be seen extending through a pin aperture 54 located within and extending through the entirety of each of the vibration isolators 40a, 40b, 40c. It is further contemplated that a washer 56 can be provided between the second portion 38 of the at least one vibration isolator 40 and the base mount 22. The washer 56 covers the hole formed by the stamped portions 46 and prevents any portion of the isolator 40 from falling through the stamped portion 46.

Any number of vibration isolators 40 is contemplated. As illustrated in FIG. 2, vibration isolator 40b is provided at a central location with respect to the pump sub-plate 42, while vibration isolators 40a and 40c are located along the back of the pump mount system to provide necessary increased support. In some implementations, only three vibration isolators are necessary to effectively dampen the vibrations that can carry between the base mount 22 and the pump sub-plate 42. As previously mentioned herein, additional vibration isolators can be added depending on the load of the pump system 50. It should be understood, therefore, that the number of vibration isolators and their locations of implementation are not limited and are shown for illustrative purposes only.

Figure 4:
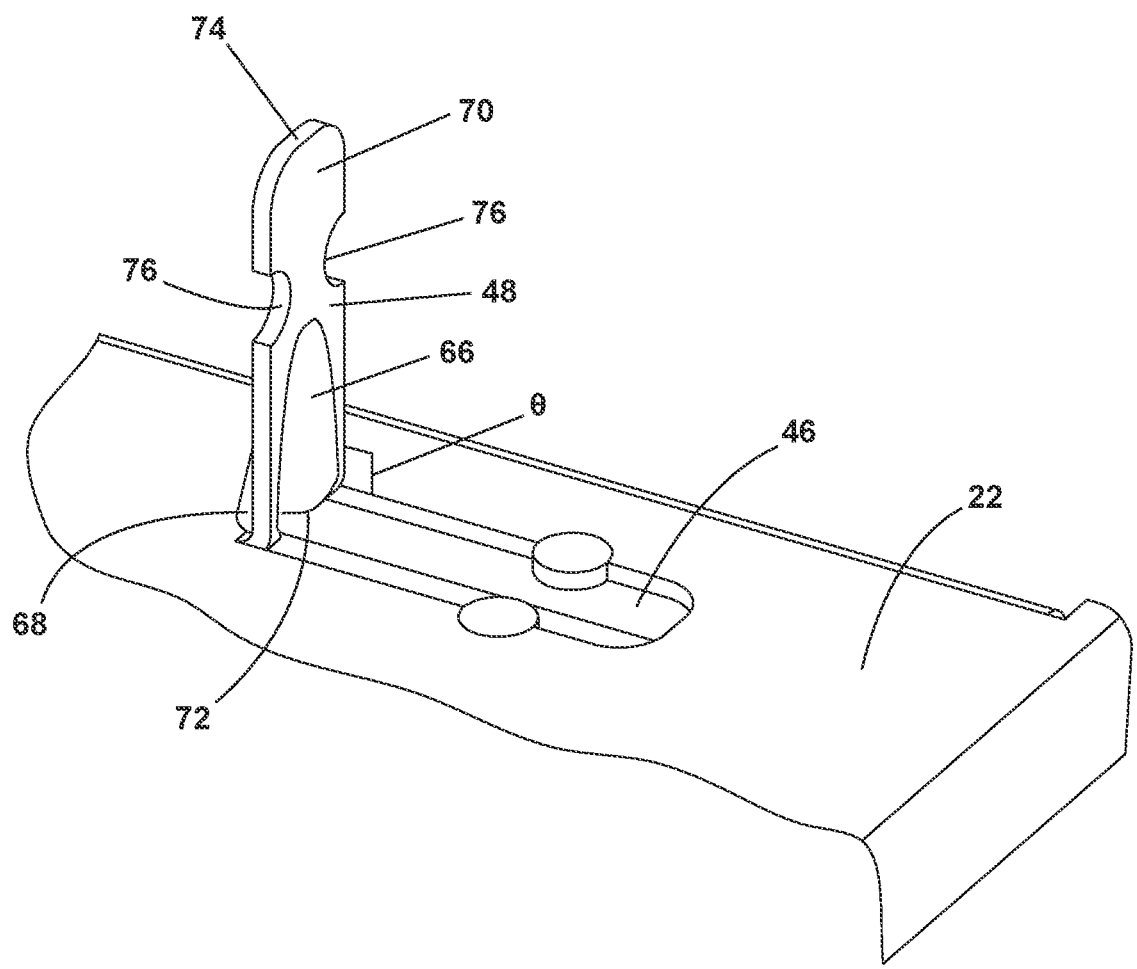
FIG. 4 is a perspective view of the pin from FIG. 3 extending from the cabinet mount.

FIG. 4 is an enlarged perspective view of a section of the base mount 22 with the stamped portion 46. The stamped portion 46 forms a shape of the pin 48. It can more clearly be seen that the pin 48 extends between a pin head 70 and base 72. The pin head 70 can be any shape, in one variation the pin head 70 is rounded with a flat top distal end 74. The pin 48 can include at least one recessed portion illustrated herein as a pair of recessed portions 76, that can be, by way of non-limiting example in the shape of a concave semi-circle. It can more clearly be seen that in an aspect of the disclosure herein, the pin 48 is integral with the base mount 22 at the base 72 such that the pin 48 is bent away from the base mount 22 until it is substantially perpendicular $\ominus$ to the base mount 22. By substantially perpendicular, the pin 48 is within +/−5° of 90° to the base mount 22. The pin 48 can include a bending indent 66 in the form of a bump 68 on a side of the pin 48 integral with the base mount 22 to enable bending of the pin 48 from the base mount 22.

Figure 5:
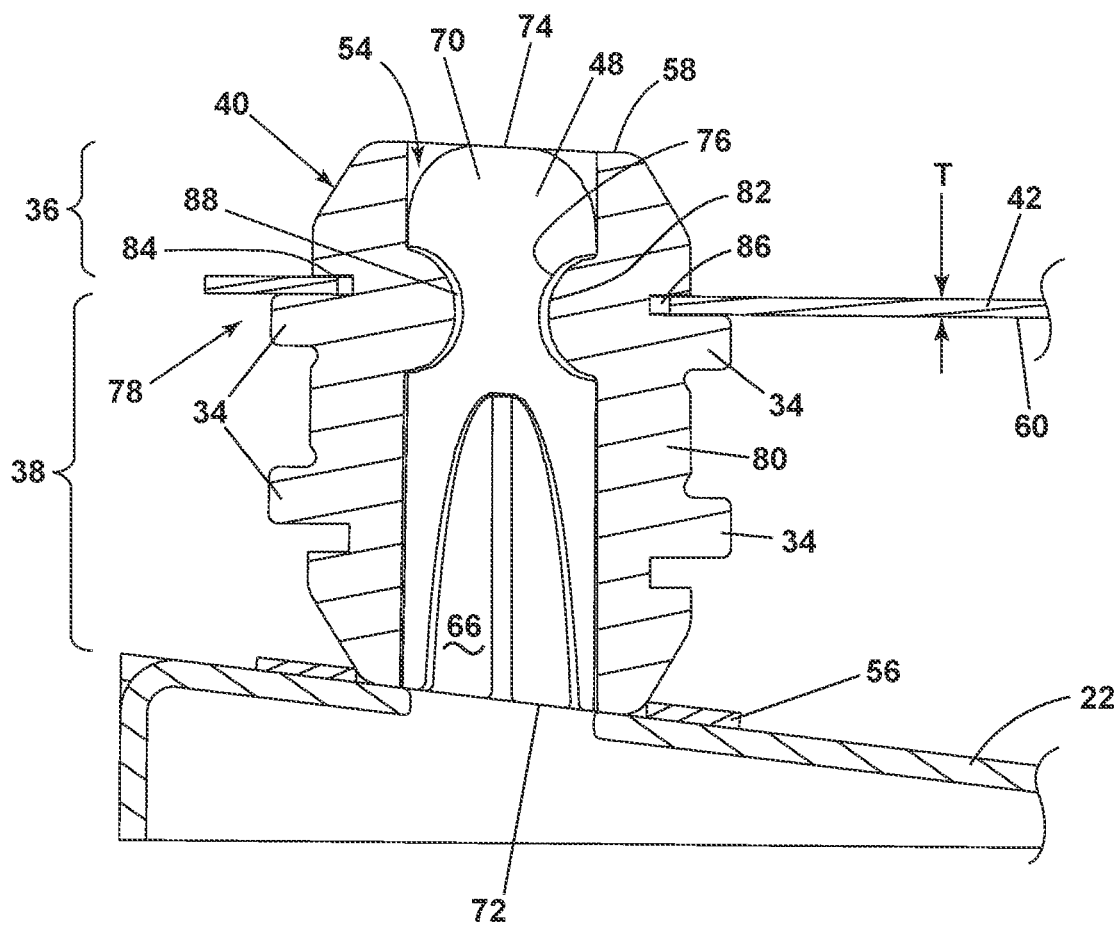
FIG. 5 is a cross-sectional view of the at least one vibration isolator with the pin from FIG. 4 extending through the vibration isolator taken along line V-V of FIG. 3 according to an aspect of the disclosure herein.

FIG. 5 is a cross-sectional view taken along line V-V of FIG. 3 for the vibration isolator 40a. It should be understood that while the cross-sectional view is taken for vibration isolator 40a it is contemplated for any of the vibration isolators described herein. The at least one vibration isolator 40 defines a body 80 circumferential about the pin aperture 54. It can more clearly be seen that the first portion 36 of the body 80 extends above the pump sub-plate 42 and the second portion 38 of the body 80 extends between the base mount 22 and the pump sub-plate 42.

A locking system 78 includes any or all of the protrusions and recesses formed on the body 80. By way of non-limiting example, the ribs 34 can be considered part of the locking system 78. The ribs 34 circumferentially extend around the body 80 and axially protrude from the body 80. At least one of the ribs 34 abuts a bottom surface 60 of the pump sub-plate 42.

The locking system 78 can further include a protrusion in the form of an in-mount ring 82 axially extending into the pin aperture 54 to form a circumferential protrusion about pin 48 when the pump mount system 12 is in place. The in-mount ring 82 can be any shape, by way of non-limiting example a semi-circle in cross-section. More specifically the in-mount ring 82 can be a convex protrusion that mirrors the concave shape of the recessed portions 76. It should be understood that the in-mount ring 82 is a rounded rib extending into the pin aperture 54. The in-mount ring 82 can be a segmented ring or a full circular ring.

The locking system 78 can further include a recess in the form of a slit ring 84 circumscribing the entirety of the body 80 and formed above at least one of the ribs 34 and below the first portion 36 of the vibration isolator 40. The slit ring 84 can define where the first portion 36 meets the second portion 38. The slit ring 84 can be cut to a width that is slightly more or equal to a thickness (T) of the pump sub-plate 42.

When the pump mount system 12 is in place, flat top distal end 74 of the pin head 70 aligns with a distal end 58 of the first portion 36 of the at least one vibration isolator 40 providing a visual confirmation that the pump sub-plate 42, and therefore the pump system 50, is fully seated. Additionally, the pair of recessed portions 76 align with the pump sub-plate 42 when the pump mount system 12 is in place such that a portion of the pump sub-plate 42 is received within the slit ring 84. The slit ring 84 is cut to an axial extent that a ring space 86 is left providing for some axial movement of the pump sub-plate 42 when the pump 14 and/or washing machine 11 is in operation.

Retention of the pin 48 within the at least one vibration isolator 40 can be enabled by the in-mount ring 82. It is contemplated that the in-mount ring 82 is formed to be smaller in size, both vertically and horizontally with respect to the recessed portions 76. The smaller size of the in-mount ring 82 with respect to the recessed portions 76 forms a recess space 88 that allows for movement of both the pump sub-plate 42 and the base mount 22 to some degree in both the vertical and horizontal directions. Depending on the movement expected, the in-mount ring 82 can be sized smaller in only one of the vertical or horizontal direction, and is not limited to both directions.

Figure 6:
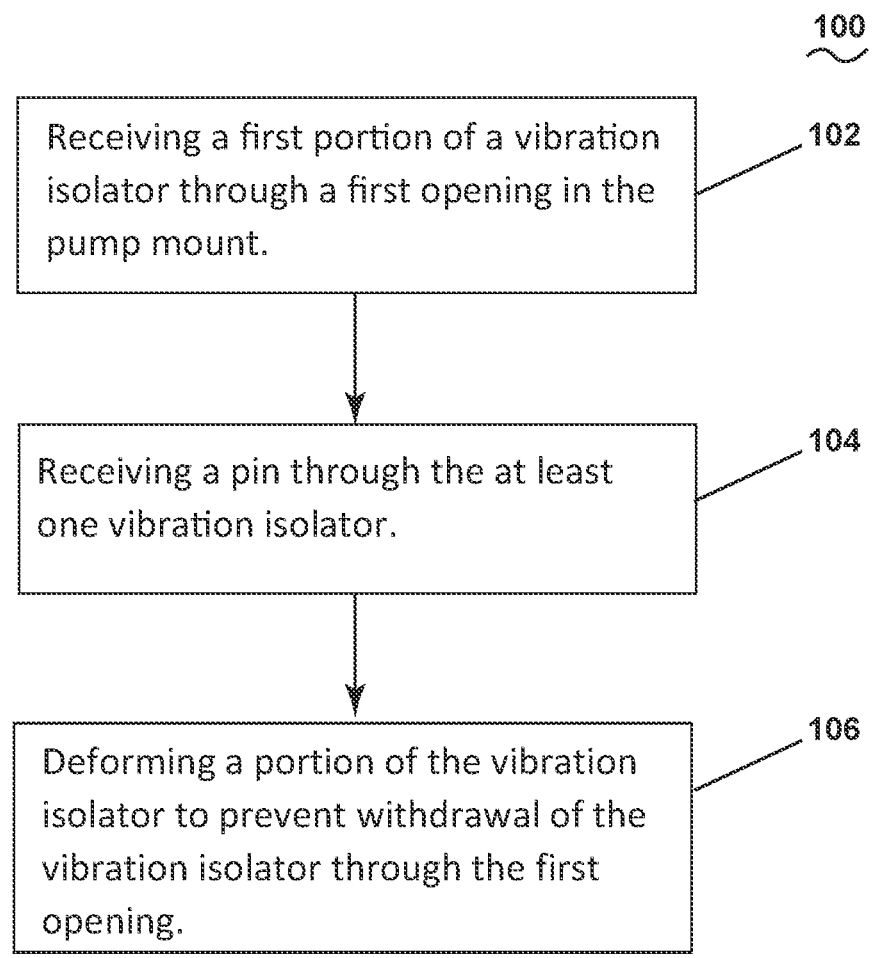
FIG. 6 is a flow chart illustrating a method of mounting a pump system to the cabinet mount.

Turning to FIG. 6, a flow chart illustrates a method 100 of mounting the pump system 50 to the base mount 22. The method includes at 102 receiving the first portion 36 of the at least one vibration isolator 40 through the first opening 44 in the pump mount, by way of non-limiting example the pump sub-plate 42. At 104 receiving the pin 48 through the at least one vibration isolator 40, by way of non-limiting example through the pin aperture 54. At 106 deforming a portion of the at least one vibration isolator 40 to prevent withdrawal of the vibration isolator 40 through the first opening 44.

In an aspect of the disclosure herein deforming a portion of the at least one vibration isolator 40 includes receiving the in-mount ring 82 within the pair of recessed portions 76. When the pump sub-plate 42 including the at least one vibration isolator 40 is pushed onto the pin 48, the in-mount ring 82 deforms when the pin head 70 comes in contact with the in-mount ring 82. As the pin 48 continues through the pin aperture 54 the in-mount ring 82 locks the pump sub-plate 42 into place when received in the pair of recess portions 76. In this manner at least one protrusion, by way of non-limiting example the in-mount ring 82, is engaged with the pin 48.

It is contemplated that the method 100 can further include engaging the at least one vibration isolator 40 with the pump sub-plate 42 by way of non-limiting example when the pump sub-plate 42 is received in the slit ring 84. Engaging can include pushing the first portion 36 of the at least one vibration isolator 40 up through the pump sub-plate 42, and then receiving the pump sub-plate within the slit ring 84 by sliding or snapping the at least one vibration isolator 40 into place.

It is further contemplated that the method 100 can include coupling the base mount 22 to the at least one vibration isolator 40 by connecting the at least one vibration isolator 40 to the pin 48 that is integral with the base mount 22.

Figure 7:
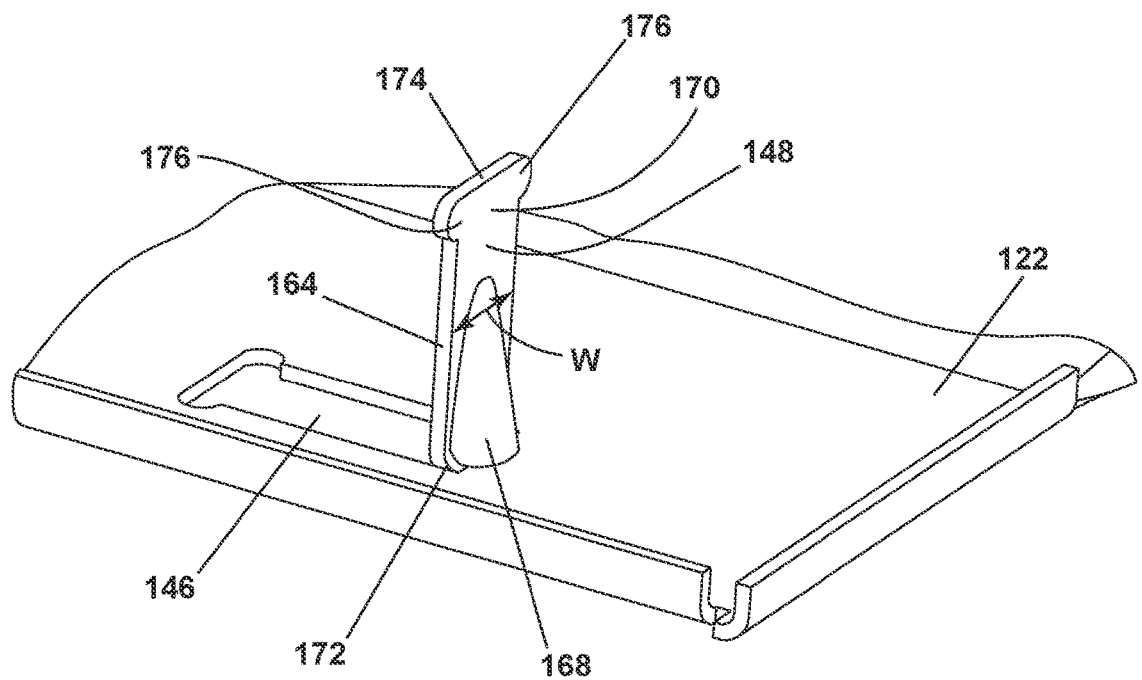
FIG. 7 is a perspective view of a variation of the pin from FIG. 4 extending from the cabinet mount according to another aspect of the disclosure herein.

Turning to FIG. 7, a perspective view of a pin 148 according to another aspect of the disclosure herein is illustrated. Aspects of the pin 148 are similar to the pin 48. Therefore, like parts will be identified with like numerals increased by 100, with it being understood that the description of the like parts of the pin 48 apply to the pin 148 unless otherwise noted.

FIG. 7 is an enlarged perspective view of a section of a base mount 122 with a stamped portion 146. The stamped portion 146 forms a shape of the pin 148. It can more clearly be seen that the pin 148 includes a body 164 extending between a pin head 170 and base 172. In an aspect of the disclosure herein the pin head 170 forms a "T shape". More specifically a distal end 174 of the pin head 170 is wider than a width (W) of the body 164. The distal end 174 defines a pair of protrusions 176.

Figure 8:
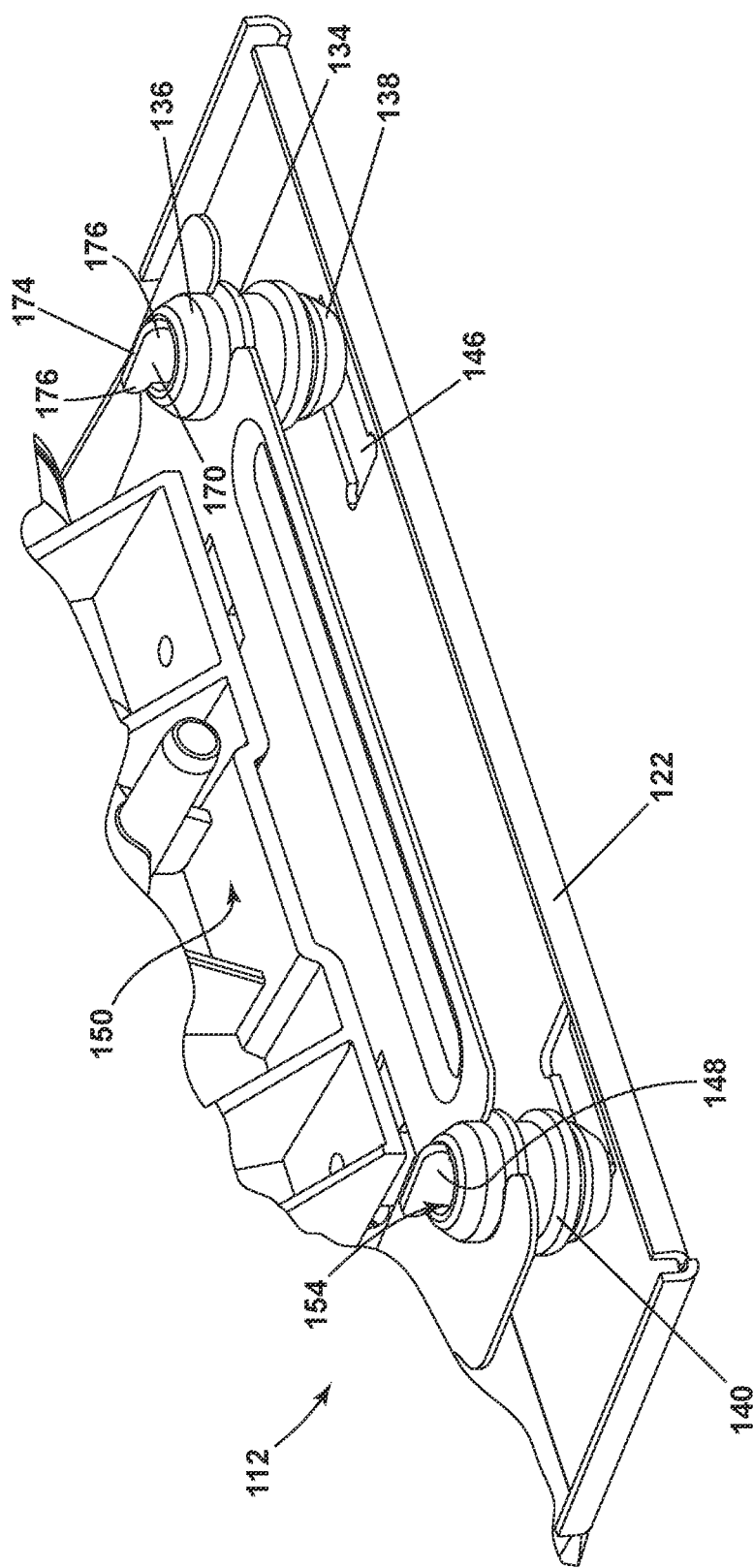
FIG. 8 is a perspective view of a section of a variation of the pump mount system from FIG. 1 with at least one vibration isolator received around the pin illustrated in FIG. 7.

FIG. 8 is a partial view of a pump mount system 112 similar to the pump mount system 12, where like parts of pump mount system 12 apply to the pump mount system 112 unless otherwise noted. Pump mount system 112 includes at least one vibration isolator 140. It can more clearly be seen that in an aspect of the disclosure herein the pin head 170 with a pair of protrusions 176 can extend above a first portion 136 of the at least one vibration isolator 140.

The method as described herein where a portion of the vibration isolator is deformed can include extending the pin head 170 through a pin aperture 154 such that the pin head 170 extends above the first portion 136 of the at least one vibration isolator 140. The pin 148 snaps into place when the pair of protrusions 176 exits the pin aperture 154 above the first portion 136 of the at least one vibration isolator 140. In this aspect of the disclosure herein the pair of protrusions 176 is engaged with the at least one vibration isolator 140 when received through the pin aperture 154.

Figure 9:
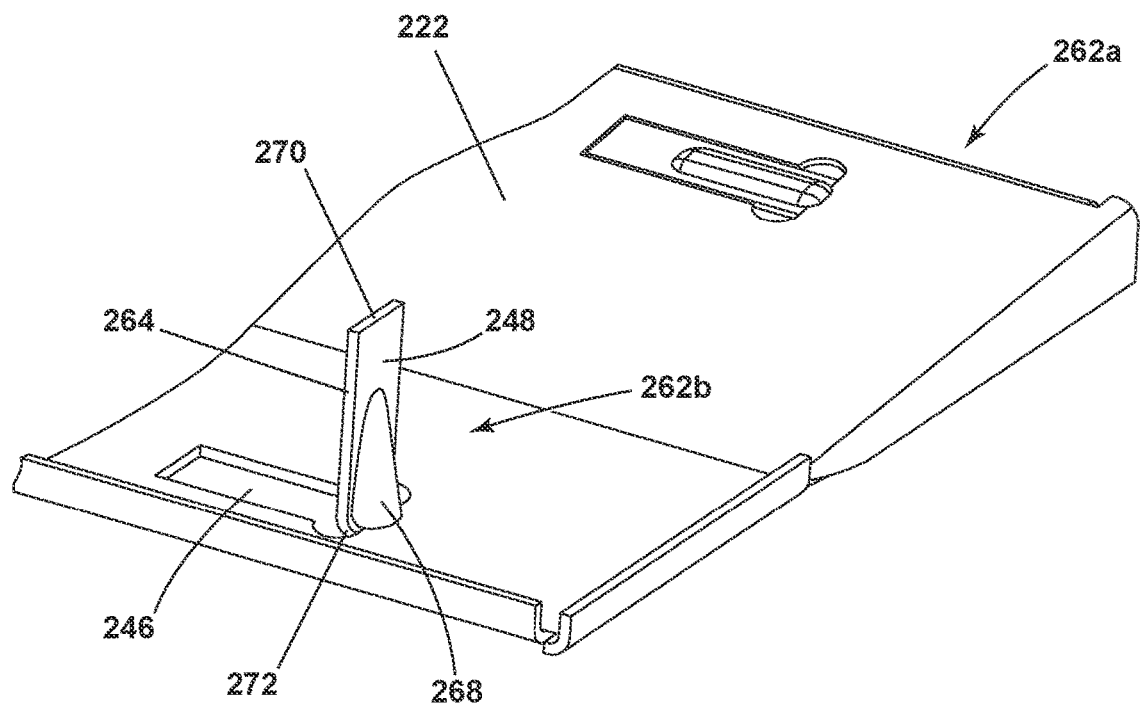
FIG. 9 is a perspective view of a variation of the pin from FIG. 4 according to another aspect of the disclosure herein.

FIG. 9 is an enlarged perspective view of a section of a base mount 222 with a stamped portion 246 in a first position 262*a* and a second position 262*b*. A pin 248 similar to pin 48 where like parts of pin 48 apply to the pin 248 unless otherwise noted, bends from the first position 262*a* to the second position 262*b* away from the base mount 222. The stamped portion 246 forms a shape of the pin 248. It can more clearly be seen that the pin 248 includes a body 264 extending between a pin head 270 and base 272. In an aspect of the disclosure herein the body 264 is substantially straight.

Figure 10:
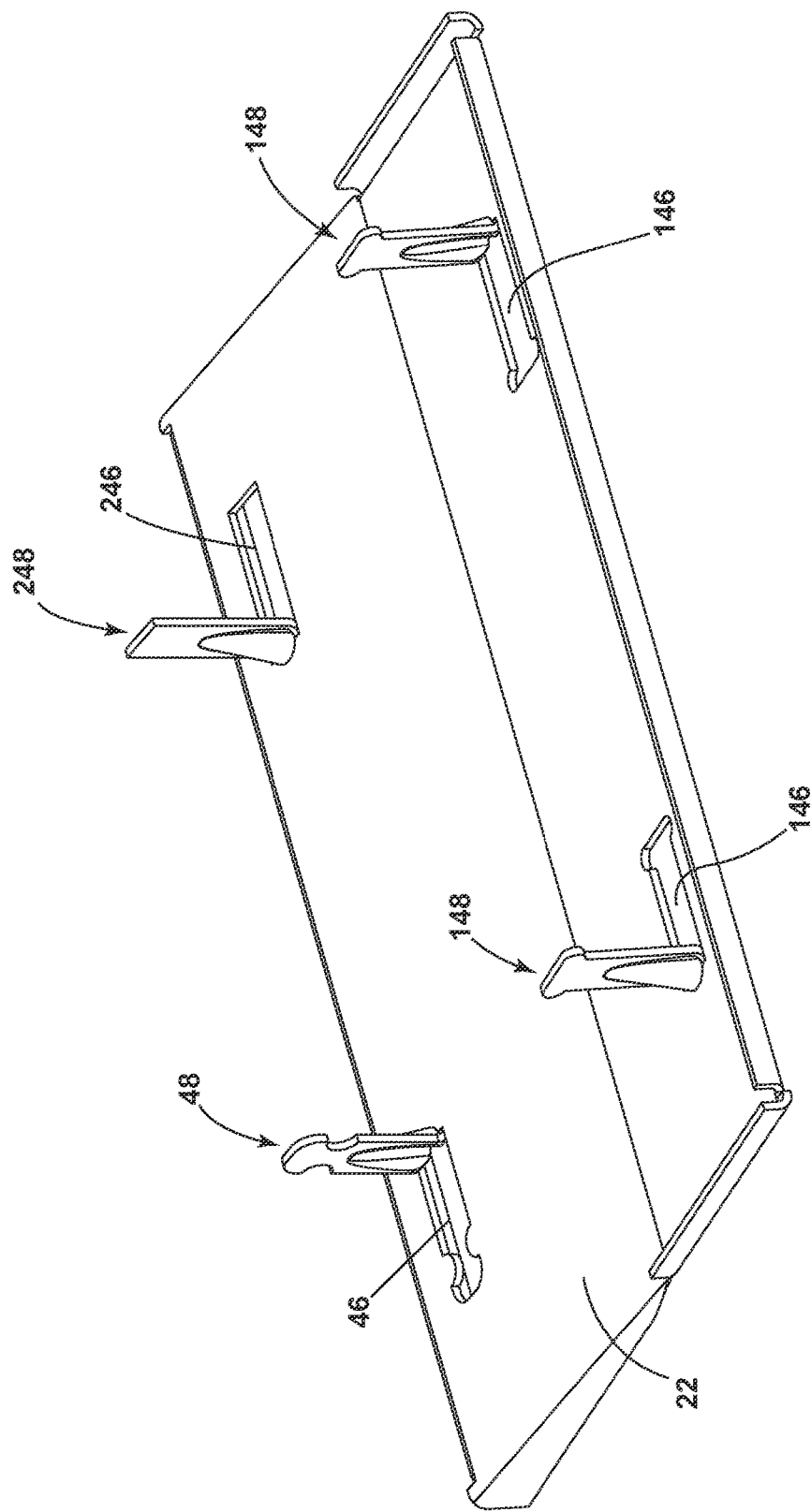
FIG. 10 is a perspective view of a variation of the cabinet mount with four pins, two according to the variation illustrated in FIG. 4, one according to the variation illustrated in FIG. 7, and one according to the variation in FIG. 9.

Turning to FIG. 10, it can be seen that a base mount, by way of non-limiting example base mount 22, can include stamped portions 46, 146, 246 according to all aspects of the disclosure discussed herein. In this manner, different types of pins 48, 148, 248 can be utilized to mount the pump system 50 (FIG. 1) to the base mount 22.

Figure 11:
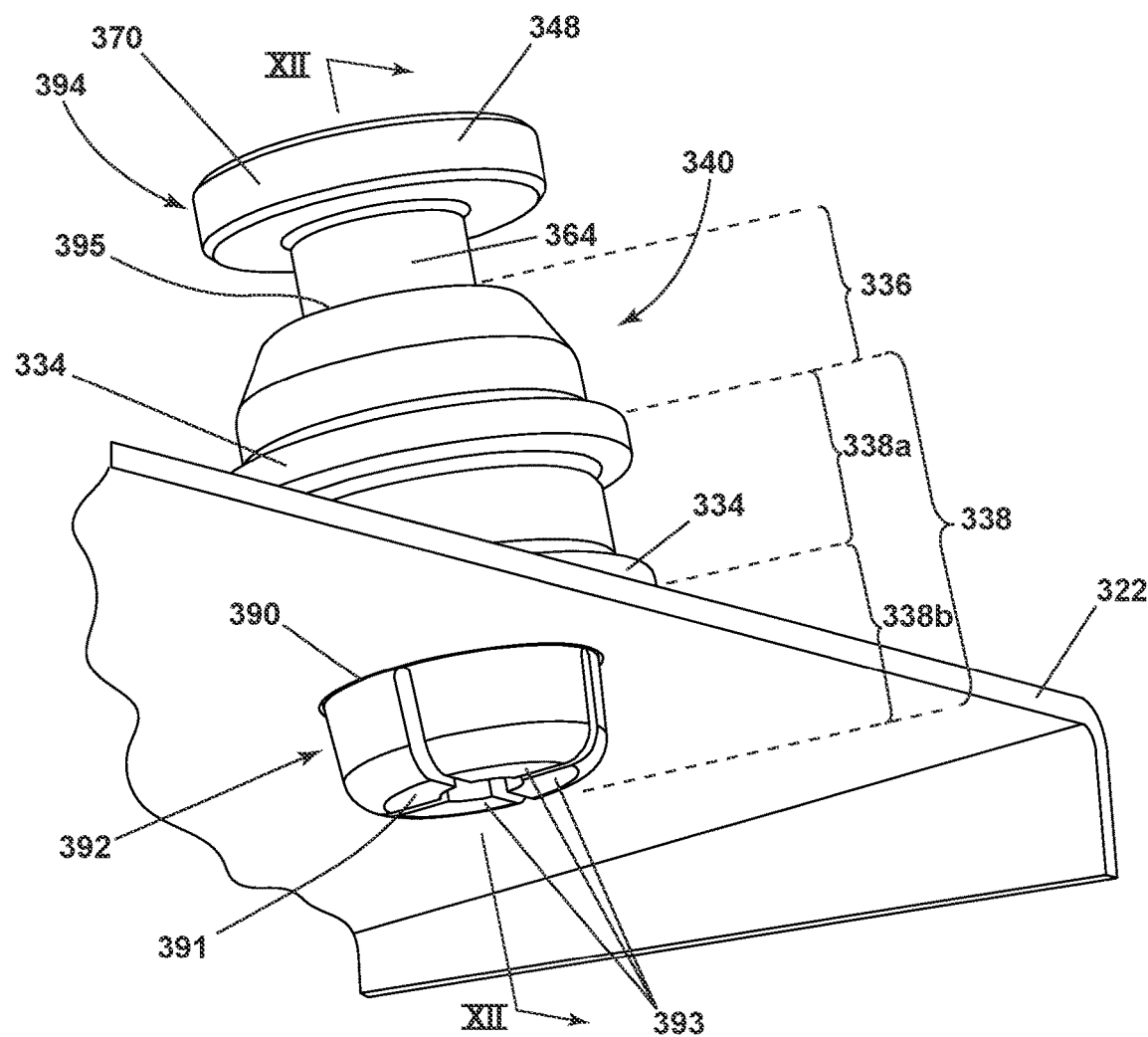
FIG. 11 is a variation of the at least one vibration isolator of FIG. 1 with a pin in a first position and extending through the vibration isolator according to another aspect of the disclosure herein.

FIG. 11 is an enlarged perspective view of a vibration isolator 340 according to another aspect of the disclosure herein. Aspects of the vibration isolator 340 are similar to the at least one vibration isolator 40. Therefore, like parts will be identified with like numerals increased by 300, with it being understood that the description of the like parts of the vibration isolator 40 apply to vibration isolator 340 unless otherwise noted.

The vibration isolator 340 is utilized in a pump mount system like the pump mount system 12 already described herein. The pump system 50 and pump sub-plate 42 have been removed for clarification. The vibration isolator 340 includes a first portion 336 extending above the pump sub-plate 42 (FIG. 2) and a second portion 338. The second portion 338 is split between an upper second portion 338*a* and a lower second portion 338*b*. The upper second portion 338*a* extends between the pump sub-plate 42 (FIG. 2) and a base mount 322. The lower second portion 338*b* extends below the base mount 322. A second opening 390 can be provided in the base mount 322 through which the lower second portion 338*b* is received.

A distal end 391 of the lower second portion 338*b* can be in the form of a slip fit 392 received easily through the second opening 390. The slip fit 392 can be an expandable slip fit 392 and include at least one deformable prong 393. While illustrated as four deformable prongs 393, it should be understood that the number of deformable prongs 393 can be any number of deformable prongs equal to or greater than two. A pin 348 in a first position 394 can extend from a top distal end 395 of the first portion 336. The pin 348 can include a pin head 370 such that the pin 348 is a push pin.

Figure 12:
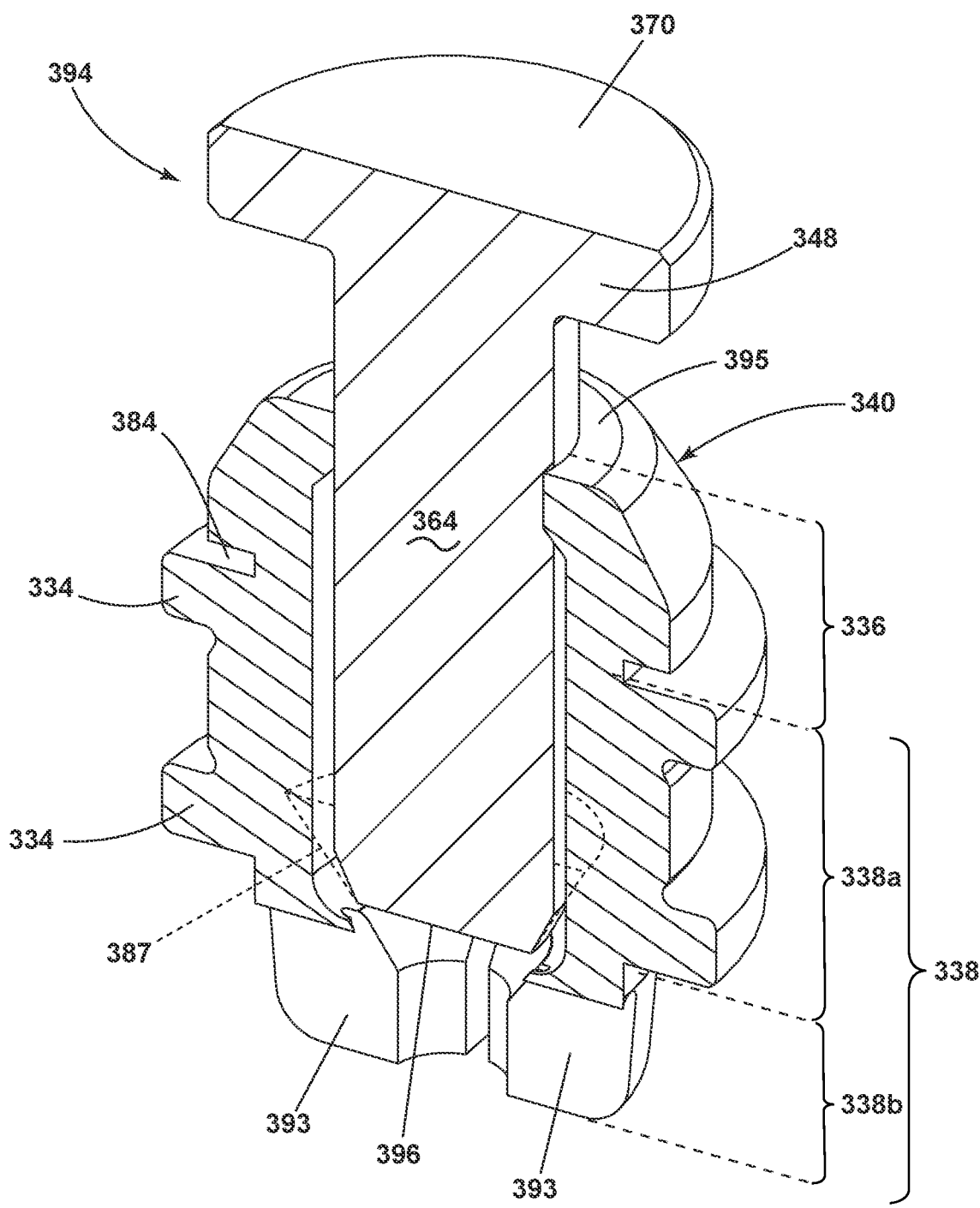
FIG. 12 is a cross-sectional view of the at least one vibration isolator from FIG. 11 taken along line XI-XI of FIG. 11.

FIG. 12 is a cross-sectional view of the vibration isolator 340 taken along line XII-XII in FIG. 11. It can more clearly be seen that when in the first position 394, a pin body 364 only extends through a pin aperture 354 extending a length equal to the first portion 36 and the upper second portion 338*a* of the vibration isolator 340. The pin 364 body can further include a tapered end 396. A barb 387 illustrated in dashed line, can extend from the tapered end 396 of the pin 348 and further prevent any extraction of the pin 348 once in place.

Figure 13:
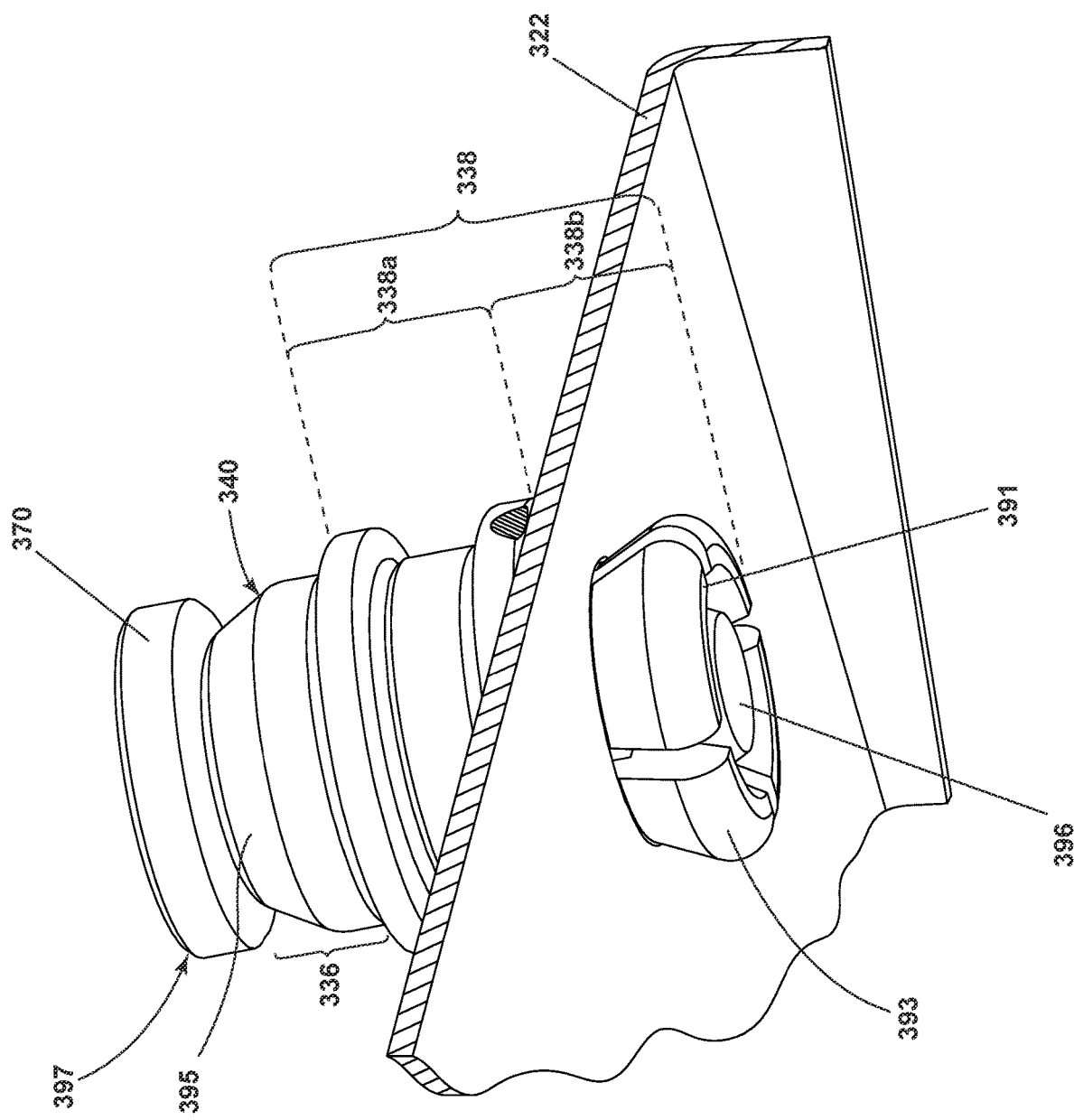
FIG. 13 is the at least one vibration isolator of FIG. 11 with the pin in a second position and extending through the at least one vibration isolator.

FIG. 13 is an enlarged perspective view of the vibration isolator 340 with the pin 364 in a second position 397. In the second position 397 the entire pin body 364 is located within the pin aperture 354. The tapered end 396 pushes the deformable prongs 393 out wherein the distal end 391 is no longer in the form of a slip fit 392 but is now splayed such that it would be difficult to pull the vibration isolator 340 out of the second opening 390.

The method as described herein where a portion of the vibration isolator is deformed can include receiving the distal end 391 through the second opening 390 and expanding the distal end 391 of the at least one vibration isolator 340. In this aspect of the disclosure herein at least one protrusion, by way of non-limiting example the deformable prongs 393, are engaged with the cabinet mount when the distal end 391 of the second portion 338 of the vibration isolator 340 is received through the second opening 390 in the base mount 322 and expanded when the pin 364 is in the second position 397. The barb 387 as described herein can extend below the base mount 322 to further ensure a secure fit.

Figure 14:
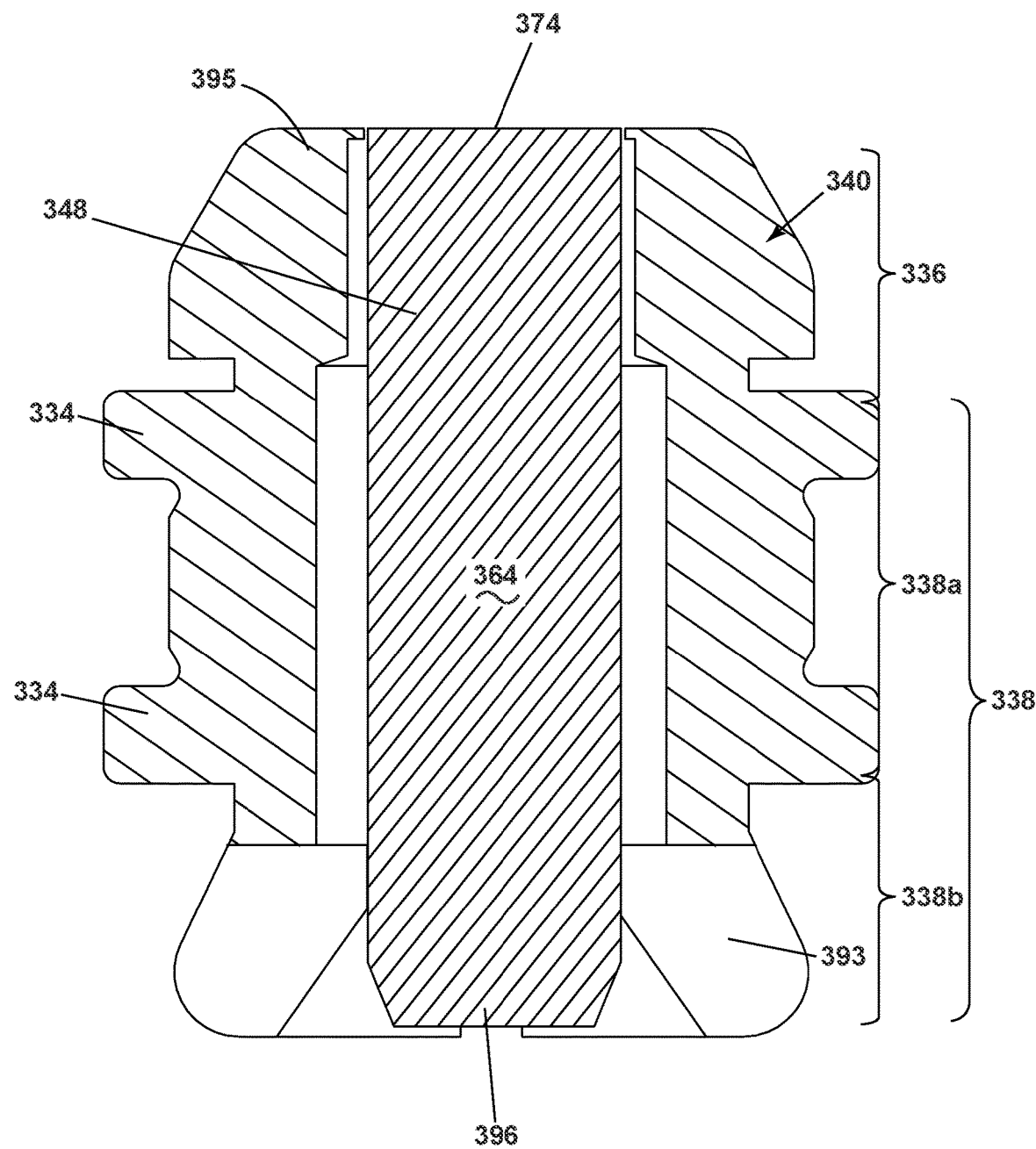
FIG. 14 is a cross-sectional view of a variation of the at least one vibration isolator of FIG. 11 with a pin in a second position according to another aspect of the disclosure herein.

In yet another aspect of the disclosure herein illustrated in FIG. 14, it is further contemplated that the pin 348 as previously described does not include a pin head 370. In this aspect when the pin 348 is fully in the second position 397 a distal end 374 of the pin 348 is aligned with the top distal end 395 of the vibrator isolator 340. During operation, advantageously without a pin head 370 unintentional pulling of the pin 348 out of the vibrator isolator 340 is minimized.

Benefits associated with the disclosure described herein include minimizing parts for a pump mount system. The pins extending from the base mount as described herein enable a top down self-locking pump mount system. The vibration isolators as described herein align with the stamped portions of the pump sub-plate. Furthermore, when in place, the slit ring as described herein provides a cutout area minimizing the chance for the vibration isolator coming cut through due to vibratory motion. Providing an extra ring space ensures free lateral movement of the pump sub-plate decoupling vibration forces to the cabinet. The drop in design enables an ease of assembly. Similarly the push pin alternative provides lateral flexibility as well with the slit ring.

Alignment of the recessed portions of the pin as described herein is designed so that vibration is isolated from the pump to the cabinet in the event the material from which the vibration isolator is made wears through. The recessed portions provides for a barb capable of minimizing vertical pump movement. Additionally aligning the top of the pin with the top of the vibration isolator provides a visual indication the pump is securely seated.

To the extent not already described, the different features and structures of the various aspects of the present disclosure may be used in combination with each other as desired. That one feature may not be illustrated in all of the aspects of the present disclosure is not meant to be construed that it cannot be, but is done for brevity of description. Thus, the various features of the different aspects of the present disclosure may be mixed and matched as desired to form new embodiments, whether or not the new embodiments are expressly described. For example, components 80, 82, and 84 can be combined in various combinations to form additional examples of dispensers without deviating from the scope of the present disclosure.

While the present disclosure has been specifically described in connection with certain specific embodiments thereof, it is to be understood that this is by way of illustration and not of limitation. Reasonable variation and modification are possible within the scope of the forgoing disclosure and drawings without departing from the spirit of the present disclosure which is defined in the appended claims.

What is claimed is:

1. A pump mount system having a pump, the pump mount system comprising:
   a pump mount secured to the pump and comprising a first opening;
   a base mount spaced from the pump mount;
   at least one vibration isolator comprising a singular body having a first portion passing through the first opening on the pump mount, a second portion extending between the pump mount and the base mount, and a pin aperture passing through the vibration isolator;
   a pin comprising a pin body extending between a pin head and a tapered end, the pin removably received within the pin aperture and movable between a first position and a second position; and
   at least one protrusion extending from the vibration isolator;
   wherein the at least one protrusion expands when the pin is in the second position and the tapered end pushes the at least one protrusion to engage with the base mount.

2. The pump mount system of claim 1 wherein the base mount comprises a second opening.

3. The pump mount system of claim 2 wherein the at least one protrusion is an expandable slip fit located at a distal end of the second portion and extends through the second opening in the base mount.

4. The pump mount system of claim 1 wherein a top of the pin aligns with a top of the first portion of the vibration isolator.

5. A pump mount system for a laundry treating appliance having a cabinet and a pump located within the cabinet, the pump mount system comprising:
   a cabinet mount secured to the cabinet;
   a pump mount secured to the pump;
   at least one vibration isolator having a first portion passing through a first opening on the pump mount, a second portion extending between the pump mount and the cabinet mount, and a pin aperture passing through the vibration isolator; and
   a pin comprising a body extending between a pin head and a tapered end, the pin removably received within the pin aperture, the pin head having a width larger than the body;
   wherein a distal end of the second portion expands to engage with the cabinet mount when the tapered end of the pin is received within the pin aperture.

6. The pump mount system of claim 5 wherein the cabinet mount comprises a second opening.

7. The pump mount system of claim 6 wherein the distal end of the second portion of the vibration isolator passes through the second opening.

8. The pump mount system of claim 7 wherein the distal end further comprises a slip fit that deforms by expanding when the pin extends through the at least one vibration isolator.

9. The pump mount system of claim 5 wherein the at least one vibration isolator is a singular piece.

10. A pump mount system having a pump, the pump mount system comprising:
    a pump mount secured to the pump;
    a base mount spaced from the pump mount;
    at least one vibration isolator comprising a first portion passing through a first opening on the pump mount, a second portion extending between the pump mount and the base mount, and a pin aperture passing through the vibration isolator; and
    a pin comprising a pin body extending between a pin head and a tapered end, the pin removably received within the pin aperture and movable between a first position and a second position;
    wherein a distal end of the second portion expands when the pin is in the second position and the tapered end pushes the at least one protrusion to engage with the base mount.

11. The pump mount system of claim 10 wherein the base mount comprises a second opening.

12. The pump mount system of claim 11 wherein the distal end of the second portion of the vibration isolator passes through the second opening.

13. The pump mount system of claim 12 wherein the distal end comprises at least one deformable prong.

14. The pump mount system of claim 13 wherein the at least one deformable prong is multiple deformable prongs defining a slip fit.

15. The pump mount system of claim 10 wherein the pin comprises a pin head.

16. The pump mount system of claim 10 wherein when in the second position a top of the pin aligns with a top of the first portion of the vibration isolator.

17. The pump mount system of claim 10 wherein the at least one vibration isolator is a singular body.

18. The pump mount system of claim 17 wherein the at least one vibration isolator further comprises at least one rib circumferentially extending around the singular body.

19. The pump mount system of claim 18 further comprising a recess circumferentially extending around the singular body, wherein the at least one rib and the recess together define a locking system.

20. The pump mount system of claim 19 wherein the singular body is formed from a rubber pliable material.

* * * * *